(12) United States Patent
Davenport

(10) Patent No.: X9134
(45) Date of Patent: Oct. 6, 1835

(54) THRASHING MACHINE, CLOVER & RICE

(76) Inventor: Moses Davenport

M. D. Moses Davenport
Letters Patent

The Schedule referred to in these Letters Patent and making part of the same containing a description in the words of the said Moses Davenport himself of his improvement in the machine for cleaning or threshing clover seed or rice

---

To all to whom these Presents shall come

Be it known that I Moses Davenport of Philips in the County of Somerset and State of Maine have invented a new and useful improvement in the Machine for Cleaning or threshing clover seed or rice upon the rubber principles and that the following is a full and exact description of the construction and operation of the said Machine as invented or improved by me, A long trough or oblong box is to be formed of about from five to eight feet long about fifteen inches deep and by from fifteen to twenty four wide according to the power to be employed it is to be set up in a sloping position having the upper end sloped and permanently closed and the lower one also closed by means of a sliding gate working between cross bars, at the top and bottom acting as grooves, with a key wedge at each end of the top bar to secure it, at any given elevation, the intention of which gate is to hold down one end of the rubber hereafter described in order to give a strong bite on the seed. There are to be two long openings made between the upper and lower cross bars sufficiently wide for the sliding bars of the rubber to pass and also high enough to admit of friction rollers on the top thereof. An opening is also to be left in the bottom of the trough adjoining this gate for the seed to run out at, and will be about ten inches long, extending from the line of bearing in the friction rollers towards the upper end of the trough and may be the whole width thereof. The lower rubber plate (which consists of a sieve of metal perforated with holes punched upwards or such other arrangement as will leave a rough surface) is to commence from the upper end of this opening and is let down or sunk some short distance just below the surface of the trough bottom that the seed may fall into it and will be from one and a half half to three feet long running up the trough. Above this rests the upper
rubber of the same dimensions bringing the two rough sides in contact, (and
is secured to the rubber frame, which bears on the top of it. This frame
consists of two long sliding bars say about two thirds of the length of the
trough which are set up edge wise & their lower ends pass through the open-
ings already described in the lower grate, the remainder lies along the
bottom of the trough having the upper rubbers secured to them & the balance
of their length is formed into a kind of rack, consisting of narrow slips
say from four to six inches deep & of the same length as the width of the trough
to be secured to the under edge of the sliding bars at intervals of about six
inches apart, At the upper end (and on the top of these sliding bars is fast-
ened on a heavy weight in the form of a head block or box, of say about
two feet in length & the other dimensions to fit the trough, it may be if a
box, filled with weights during the operation and then removed for the
transportation of the Machine elsewhere, as three hundred weight nearly
may be requisite inorder to effect the purpose that of giving leverage or
bearing enough on the rubbers from the fulcrum at the other end of the slid-
ing bars through the lower gate, to cleanse the seed. The upper end of this
box has a row of teeth at the bottom to descend about the same depth
as the narrow slips of the rack, (and the top of this same end has a pro-
jection with a slit in it at each side, in order to receive therein an
arm to each (turning upon a pin or pivot) of about fifteen inches in
length to project forward where they are terminated in other slits
to receive one other arm to each joined also by a pin or pivot joint the
second one to be somewhat shorter than the first & is to terminate in a
pointed edge which falls by means of the pointed arms to the bottom
of the trough where it (or rather both pointed ends) rest in a notch
cut for the purpose. in each side bar of another short rack, at this upper
end of said trough. (and which side bars work through openings left for that
purpose at the bottom of the upper end piece (and are connected by cross bars
lying flat on the bottom of said trough, presenting say a width of about five
inches, the length equal to the width of the trough & the upper edge bevelled
to a sharp one with the lower edge squared at a right angle equal to the the depth of the box so as to shove the seed and hulls downwards or towards the rubber plates. Between this rack & the upper end of the head block is placed a sliding door or plate to rise up & down in a groove cut on the sides of the trough for that purpose which is intended as a means of feeding the rubber plates with regularity having slits at each side for the reception of the long arm. The short arm abovementioned has a pin passing through it and the side of the trough at somewhat more than half way down as a fulcrum by which the leverage is exerted on the rack below so as to drive it ahead. The head block has at each side and near the lower angle of the lower end thereof, a small projecting inclined plane rising from said joint towards the opposite angle at the upper & forward end and passing somewhat more than halfway through the side of the trough where a sufficient opening or hollow space is formed to admit of the motion of said plane as it is driven forwards over another similar one advancing from the outside of the trough (where it works upon a pin & joint, upon an upright from the stand below) each being of nearly the same length, so as to pass easily, and the hollow is continued obliquely up, for the purpose of taking out the head block rack and rubber &c when necessary). Instead of the first plane a small friction roller may be used so as to pass either over or beneath the second plane; On the top of the rubber rack & between the sliding bars is placed a long bar extending from the lower end of the upper rubber to the head block. & has a mortise taken out at the upper end for the purpose of receiving a windlass lever to work upon a pivot there, and the other or lowered end of it, is to work between the sliding bars upon a pin or pivot also. The windlass lever is to play upon a shaft extending across the top of the trough and working in journals and boxes or other fixtures properly adapted thereto, the long arm extending over the lower end of the trough (where the power of whatever kind it is to be driven by will be applied) and the short arm descending by an oblique angle into its position between the sides of the mortise in the bar above described, to which it is united by the pin or pivot. The whole Machine may be supported as best adapted either by legs and benches beneath or otherwise. A chain may be substituted for for the bar just described. Operation. The seed being presented at the upper end, & the lever set in motion by bearing down, it raises the last described bar between the sliding bars, and at the same time draws it forward, this of course brings with it the sliding bars & rubber frame by means of the pivot joints connecting them so far as to cause the projecting inclined planes at the sides of the head block to rise over & fall on the other side of those planes from the outside (or the friction roller to do the same) and while this is doing the upper rubber plate is consequently raised from the lower one & carried upwards. The long arm in front of the head block drives forward the short one which by its resistance at the fulcrum gives to the short rack beneath it a contrary motion directing the hulls & seeds towards the rubbers and which are admitted in such quantities as may be desired by means of the sliding door, a plate being raised sufficiently for the object. That portion of the unthrashed seed which passes to the lower side of this grate is taken hold of by the teeth of the head block & drawn under the rack, where each stroke of the machine advances it one interval at a time, between the rubber plates, when the backward motion given by raising the lever handle rubs it one way only & that of course downwards, the bearing to produce which is obtained by the resistance from the fulcrum ends of the sliding bars beneath the friction roller sustained by the seeds &c to the fall of the weight of the head block operating in its leverage obtained thereby at the other end. Each fall of the windlass bar raises the upper rubber & each rise thereof causes it to descend by its own weight as its friction roller or inclined plane passes under that of the arm from the outside and thereby forces the seed downwards between the plates till it comes to the opening at the bottom where it all falls through. The bearing or resistance at the fulcrum may be increased at pleasure by withdrawing the sliding wedge at the top cross bar of the lower grate & forcing it down lower securing it there will give a harder bite & bring the rubber plates nearer together.

What I claim as my invention and not before known or used used in the abovedescribed Machine is. First, The principle of
rubbing out the seed by a repetition of the operation directed always
in the same line or by always rubbing one and the same way between
two planes. Secondly. The peculiar structure or combination of
the several parts viz. The use of the lower gates as constructed. The
construction and combination of the rubber frame connecting of the
sliding bars & strips composing the rack for the reception of the up-
per plate also the application of the head block with the friction rol
lers or inclined planes attached thereto, and that of the inclined planes
advancing inwards from the outside. Also the application of the arms
from the said head block and of the rack in front into which they play.
Also the sliding door or plate in front of the head block to let in the
hulls & seeds, also the lever (windlass) as constructed and that con-
struction of the trough as described being the provision for receiving the
lower rubber plate and so much of the Machinery as is claimed above.
In testimony that the above is a full clear and exact description
of the construction and operation of my machine as invented or im-
proved by me I have hereunto set my hand this twenty sixth day
of August Eighteen hundred and thirty five Witnesses
Chs. W. Wharton
Henry Stone Moses Davenport Exd
[illegible]

(2220 words)

(Patented October 6. 1835)